Figure 1:
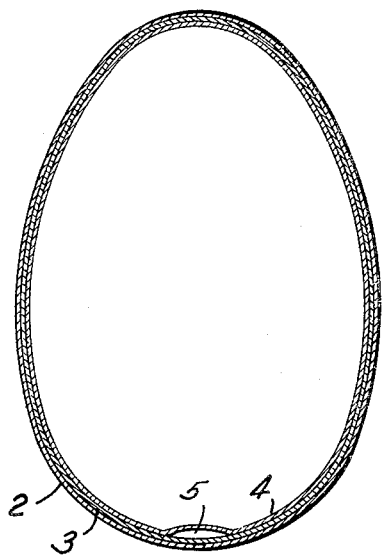
Figure 2:
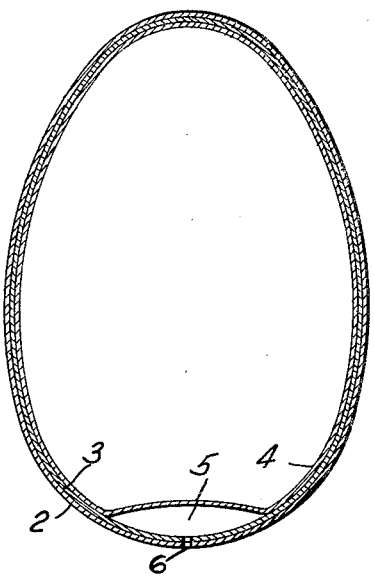

June 5, 1962     F. M. FLORY     3,037,479
METHOD OF VENTILATING EGGS
Filed Nov. 20, 1958

INVENTOR
FRANK M. FLORY
BY George L. Herr
ATTORNEY 3,037,479
METHOD OF VENTILATING EGGS
Frank M. Flory, Manheim Township, Lancaster County, Pa., assignor to Indian River Poultry Farms, Inc., Lancaster, Pa., a corporation of Delaware
Filed Nov. 20, 1958, Ser. No. 775,174
3 Claims. (Cl. 119—1)

This invention relates to a method of increasing the rate of yield of live domestic fowl, examples of which are chickens, turkeys, ducks, etc., from a quantity of eggs in an incubator, and more particularly to a method of increasing the ventilation of the egg so as to enhance the chance of the fowl hatching from the egg.

In the production of fowl from eggs in the conventional incubation process, a certain percentage of the fowl do not hatch from fertile eggs but on the other hand die from one cause or another sometime during the hatching cycle. One of the most critical times for a hatching fowl to survive is that period from about the fourteenth day to the expiration of the twenty-one day hatching cycle. From about the seventeenth day on, the hatching fowl begins to move around in the egg and is attempting to muster sufficient strength to break the egg shell and free himself. During this period it has been shown that the oxygen requirement increases very greatly and some fowl die. The exact cause of the death of the fowl is not definitely known at this time but it is believed to be of a respiratory nature.

The egg is provided with a porous shell for the ingress of oxygen to the interior and egress of gases evolved therein to the exterior. However, when eggs of some species are exposed to incubation by means of artificial incubators, these naturally occurring pores in the egg shell are believed to be inadequate to properly ventilate the egg.

An object of this invention is to provide a method of increasing the rate of ventilation through the egg shell.

It has been found that one acceptable method of increasing the ventilation is by puncturing the egg shell sometimes during the hatching cycle. The increased ventilation caused thereby has resulted in an increase in the number of fowl that can be hatched from a given quantity of eggs.

Care must be exercised in placing the hole in the egg so as not to damage the embryo and cause the death of the fowl being hatched. Eggs are encased in a brittle exterior egg shell and two flexible membranes. The outer flexible membrane adheres to the interior of the brittle egg shell and the inner flexible membrane encases the fluid contents of the egg. At the time an egg is first produced, the two flexible membranes are substantially coextensive, however, as the egg ages, the inner membrane shrinks forming a cell between the two membranes. This cell usually forms at the large end of the egg. Due to the porous nature of the egg shell and also the porous nature of the two membranes, this cell contains air which passes through the egg shell and the outer membrane and gases evolved from the embryo which pass through the inner membrane.

For artificially hatching eggs, it has been found that the yield is increased if an opening is made through the egg shell and the outer membrane which enhances the entrance of air into the cell and also aids in removing the evolved gases from the interior of the egg. This opening may be made by any suitable means such as by drilling, punching, or by exposing the egg to a vibrating element which produces a hole in the shell and the outer shell membrane. It is essential that the perforating be performed in such manner that the inner shell membrane is not damaged, because to do so would deleteriously effect the incubation of the egg. This perforating operation can be performed by a gang-type device which simultaneously perforates a group of eggs arranged in an incubator tray.

It has been found that after about three days the air cell is large enough that the egg shell and outer shell membrane can be penetrated without the danger of rupturing the inner shell membrane. In carrying out this invention it is preferable that the puncturing operation be performed sometime between the fourteenth and seventeenth day. However, the invention is not limited to practice within this period. At about the eighteenth day, the fowl has reached its peak of activity in the egg and it is desirable that the perforation be made before the period of maximum activity is reached.

The size of the hole is not critical so long as it does not cause dehydration of the egg. The location of the hole is dependent on the location of the air cell to a certain extent because it is more convenient to puncture the outer membrane without damaging the inner membrane in the area of the cell.

It has been found that in a given quantity of eggs in an incubator tray the yield of fertile eggs can be increased 5% by use of this invention in cases where the normal yield runs between 80% and 90%. Where the normal yield is higher than 90%, the increase by using the invention will probably be less than 5% while in those cases of a yield below 80%, the yield increase will probably be greater than 5%.

In the accompanying drawing, FIGURE I shows an egg shortly after it has been produced by the fowl and FIGURE II shows an egg with the air cell partially developed.

Referring to FIGURE I, the egg shell is designated by the numeral 2 and the outer shell membrane by the numeral 3 while the inner shell membrane is designated by the numeral 4. For purposes of illustration, a space is shown between the two membranes and between the outer shell membrane and the shell, but it will be understood that the shell and outer membrane are in tight engagement with one another and the two membranes are together at all points except at the air cell. It will be observed from an examination of FIGURE I that the air cell has started to form in the area 5. When the air cell 5 is as small as that shown in FIGURE I, it is difficult to rupture the shell and outer shell membrane without damaging the inner shell membrane. It can be done, however, when the cell is as small as shown in FIGURE I but it is preferable to wait until the cell has developed to the size shown in FIGURE II or larger because it can then be perforated as at 6 with little likelihood of damaging the inner shell membrane.

It will be obvious to those skilled in the art that this invention provides a method of increasing the rate of ventilation of an egg by reducing the resistance to passage of air into the egg and reducing the resistance to the removal of gases evolved from the egg.

I claim:

1. In a method of hatching eggs, the steps comprising subjecting the eggs to incubation conditions and allowing them to remain thereunder until the air cell has formed, and thereafter perforating the egg shell and outer shell membrane in the vicinity of the air cell.

2. In a method of hatching eggs, the steps comprising subjecting the eggs to incubation conditions and allowing them to remain thereunder until the air cell has formed, and thereafter perforating the egg shell and outer shell membrane in the vicinity of the air cell while maintaining the inner shell membrane in its original condition.

3. In a method of hatchng eggs, the steps comprising subjecting the eggs to incubation conditions for the usual hatching cycle and prior to the eighteenth day of incubation perforating the egg shell and outer shell membrane in the vicinity of the air cell.

References Cited in the file of this patent

UNITED STATES PATENTS

| | | |
|---|---|---|
| 2,704,531 | Bailey | Mar. 22, 1955 |
| 2,824,546 | Klette | Feb. 25, 1958 |